United States Patent
Portal

(10) Patent No.: US 8,307,328 B1
(45) Date of Patent: Nov. 6, 2012

(54) ACCESSING EXTERNAL FUNCTIONALITY FROM WITHIN A TEST EXECUTIVE TOOLKIT

(75) Inventor: Christian A. Portal, Holliston, MA (US)

(73) Assignee: The MathWorks, Inc., Natick, MA (US)

(*) Notice: Subject to any disclaimer, the term of this patent is extended or adjusted under 35 U.S.C. 154(b) by 1023 days.

(21) Appl. No.: 12/061,400

(22) Filed: Apr. 2, 2008

(51) Int. Cl.
G06F 9/44 (2006.01)

(52) U.S. Cl. .................................................. 717/105

(58) Field of Classification Search .................. None
See application file for complete search history.

(56) References Cited

U.S. PATENT DOCUMENTS

| | | | |
|---|---|---|---|
| 5,555,370 A * | 9/1996 | Li et al. ..................... 715/763 |
| 6,397,378 B1 | 5/2002 | Grey et al. |
| 6,401,220 B1 | 6/2002 | Grey et al. |
| 6,473,707 B1 | 10/2002 | Grey |
| 6,507,842 B1 | 1/2003 | Grey et al. |
| 6,577,981 B1 | 6/2003 | Grey et al. |
| 6,754,850 B2 | 6/2004 | Grey et al. |
| 6,829,733 B2 | 12/2004 | Richardson et al. |
| 6,868,508 B2 | 3/2005 | Grey |
| 6,907,557 B2 | 6/2005 | Perez et al. |
| 6,971,084 B2 | 11/2005 | Grey et al. |
| 6,993,772 B2 | 1/2006 | Pike et al. |
| 7,076,411 B2 | 7/2006 | Santori et al. |
| 7,093,249 B2 | 8/2006 | Melamed et al. |
| 7,143,361 B2 | 11/2006 | Ramchandani |
| 7,146,572 B2 | 12/2006 | Richardson |
| 7,165,253 B1 | 1/2007 | Pike et al. |
| 7,191,361 B2 | 3/2007 | Grey et al. |
| 7,353,502 B2 | 4/2008 | Stewart et al. |
| 7,454,659 B1 | 11/2008 | Gaudette et al. |
| 2005/0065990 A1* | 3/2005 | Allen ............................ 708/495 |
| 2007/0106489 A1* | 5/2007 | Eryilmaz ....................... 703/22 |
| 2007/0271254 A1* | 11/2007 | Iglesia et al. ...................... 707/5 |
| 2007/0282556 A1* | 12/2007 | Achkar et al. ................. 702/108 |

OTHER PUBLICATIONS

"Partial Differential Equation Toobox." Copyright 1984-1997 by The Mathworks, Inc. http://radio.feld.cvut.cz/matlab/pdf_doc/pde/pde.pdf.*
"SystemTest 1: User's Guide," The Math Works, Inc., Mar. 2007, pp. i-viii, 1-1 to 1-46, 2-1 to 2-19, and Index-1 to Index-5.
Pickin, Simon et al., "System Test Synthesis from UML Models of Distributed Software," IEEE Transactions on Software Engineering, Apr. 2007, pp. 1-16.
"MATLAB 7: Graphics," The MathWorks, Inc., Mar. 2007, pp. i-xviii, 1-1 to 1-66, 4-1 to 4-38, 5-1 to 5-82, and Index-1 to Index-11.

(Continued)

Primary Examiner — Wei Zhen
Assistant Examiner — Adam R Banes
(74) Attorney, Agent, or Firm — Cesari and McKenna, LLP; Michael R. Reinemann

(57) ABSTRACT

A system and method encapsulates selected functionality of a programming environment, defines an interface to the encapsulated functionality, and utilizes the encapsulated functionality from within an add-on toolbox to the programming environment through the interface. Objects may be constructed from the selected functionality of the programming environment. The functionality may be built-in or custom designed functionality. The objects are registered with the add-on test toolbox, and made available to a user of the add-on toolbox. The user may enter information into a user interface specifying selected functionality and its properties. An object manipulation engine receives the to information entered into the user interface, and uses it to issue calls through the interface to construct the objects and invoke one or more of the methods.

20 Claims, 11 Drawing Sheets

OTHER PUBLICATIONS

"SystemTest 1: User's Guide," The MathWorks, Inc., Mar. 2007, pp. i-viii, 1-1 to 1-46, 2-1 to 2-20, 3-1 to 3-26, 4-1 to 4-14, 5-1 to 5-14, 6-1 to 6-10, 7-1 to 7-40, A-1 to A-2, and Index-1 to Index-5.

"SystemTest 2: User's Guide," The MathWorks, Inc., Sep. 2007, pp. i-x, 1-1 to 1-46, 2-1 to 2-28, 3-1 to 3-22, 4-1 to 4-28, 5-1 to 5-16, 6-1 to 6-14, 7-1 to 7-10, 8-1 to 8-18, 9-1 to 9-42, 10-1 to 10-6, A-1 to A-2, and Index-1 to Index-6.

"MATLAB® 7: Graphics," The MathWorks, Inc., Mar. 2007, pp. i-xviii, 1-1 to 1-66, 2-1 to 2-26, 3-1 to 3-68, 4-1 to 4-38, 5-1 to 5-82, 6-1 to 6-40, 7-1 to 7-104, 8-1 to 8-118, 9-1 to 9-20, 10-1 to 10-42, and Index-1 to Index-11.

* cited by examiner

ACCESSING EXTERNAL FUNCTIONALITY FROM WITHIN A TEST EXECUTIVE TOOLKIT

BACKGROUND OF THE INVENTION

To create a program, a user may employ a programming environment. Typically, the programming environment, which may run on a computer system, includes textual and/or graphical interfaces for use in creating the program. The programming environment may also have a number of tools for performing desired tasks. Exemplary programming environments include the MATLAB® and Simulink® systems both from The MathWorks, Inc. of Natick, Mass., the LabVIEW® application development system from National Instruments Corp. of Austin, Tex., and the Agilent VEE application development system from Agilent Technologies, Inc. of Santa Clara, Calif., among others.

Add-on tools or toolboxes may be combined with the programming environment to extend its functionality. For example, a number of add-on products and/or toolboxes are available for the above-mentioned systems. One such add-on product is the SystemTest test executive also from The MathWorks, Inc., which allows a user to specify a test sequence that includes commands and models, among other things, to test a device under is test (DUT) or a system under test.

In some cases, however, a toolbox only provides a limited set of certain functionality, such as plotting routines, from an otherwise larger set of functionality available in the underlying programming environment. Furthermore, a user sometimes creates and saves custom functionality in the programming environment.

SUMMARY OF THE INVENTION

Briefly, the invention relates to a system and method for encapsulating selected functionality of a programming environment, defining an interface to the encapsulated functionality, and utilizing the encapsulated functionality from within another tool or component, such as a test executive add-on toolbox, through the interface. In an embodiment, information regarding the selected functionality is registered with the test executive, thereby making the selected functionality available to a user of the test executive. More specifically, a user interface may display the registered functionality to a user of the test executive add-on toolbox for incorporation within the test executive add-on toolbox. In response to the user designating and incorporating various functions within the test executive add-on toolbox, calls are issued through the interface to an object constructor. The object constructor, in response to these calls, constructs objects encapsulating the designated functions of the programming environment.

The objects, which are constructed from one or more base classes, have methods and properties or parameters. As the user works with the functionality from within the test executive add-on toolkit, such as through a graphical user interface (GUI), calls are issued through the interface to the encapsulated functionality that, in turn, result in methods of the objects being invoked, and properties or parameters of the objects being retrieved or set. One or more of the methods, moreover, may result in information being received by the test executive, e.g., to present or update a display. The invention thus provides a technique whereby functionality of the programming environment is made available to the user of the toolbox without having to incorporate the functionality into the toolbox itself.

The functionality selected for registration with the test executive may include both pre-existing, built-in functionality of the programming environment as well as custom defined functionality created by the user. Specifically, an object registration method may be exposed to a user of the programming environment. The user can employ the registration method to have one or more functions that the user custom defined within the programming environment registered with the test executive. Once registered, the custom defined functions can be accessed from within the test executive. Specifically, in response to the user designating and incorporating the custom defined functionality within the test executive, calls may be issued through the interface that result in an object that encapsulates the custom defined functionality being constructed. Thereafter, as the user works with the custom defined functionality from within the test executive, calls are issued through the interface that result in methods being invoked on the object, and properties being retrieved and set.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
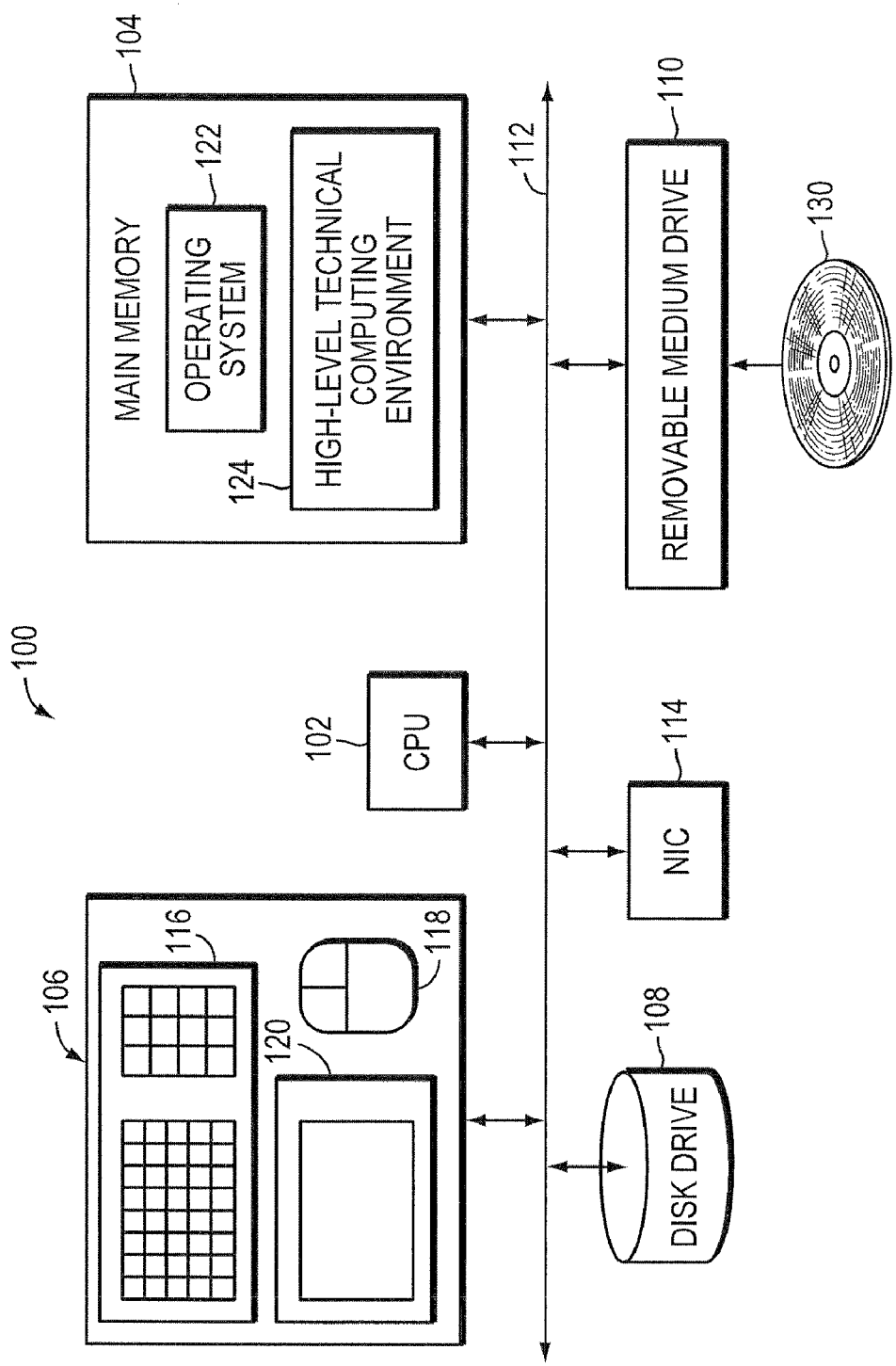
FIG. 1 is a schematic block diagram of a computer system suitable for use with the present invention.

FIG. 1 is a schematic illustration of a suitable computer system 100 for implementing and utilizing an embodiment of the invention. The computer system 100 includes a central processing unit (CPU) 102, a main memory 104, user input/output (I/O) 106, a disk drive 108, and a removable medium drive 110 that are interconnected by a system bus 112. The computer system 100 may also include a network interface card (NIC) 114. The user I/O 106 includes a keyboard 116, a mouse 118 and a display 120.

The main memory 104 stores a plurality of libraries or modules, such as an operating system 122, and one or more applications running on top of the operating system 122, including a programming environment 124.

The removable medium drive 110 is configured to accept and read a computer readable medium 130, such as a CD, DVD, floppy disk, solid state drive, tape, flash memory or other medium. The removable medium drive 110 may further be configured to write to the computer readable medium 130.

Suitable computational devices include personal computers (PCs), workstations, laptops, palm computers and other portable computing devices, etc. The computer system 100 of FIG. 1 is meant for illustrative purposes only, and different embodiments may be used with other processing systems or computation devices, such as, for example, digital cameras, smart phones, etc.

Suitable operating systems 122 include the Windows® series of operating systems from Microsoft Corp. of Redmond, Wash., the Linux operating system, the MAC OS® series of operating systems from Apple Inc. of Cupertino, Calif., and the UNIX® operating system, among others.

An engineer, scientist, programmer, or other person utilizes the keyboard 116, the mouse 118 and the computer display 120 of the user I/O 106 to operate the programming environment 124.

Suitable programming environments for use with the present invention include the MATLAB® and SIMULINK® systems from The MathWorks, Inc. of Natick, Mass., the LabVIEW® application development system from National Instruments Corp. of Austin, Tex., the Visual Engineering Environment (VEE) from Agilent Technologies, Inc. of Santa Clara, Calif., and the Khoros development system from AccuSoft Corp. of Northborough, Mass., among others. The programming environment may be used to create applications, programs or scripts and/or to run programs or scripts, such as during algorithm development or design exploration. As described herein, the programming environment 124 may include certain built-in, e.g., predefined, functionality. It may also include tools for creating custom-defined functionality that may be integrated into or with the programming environment 124.

Figure 2:
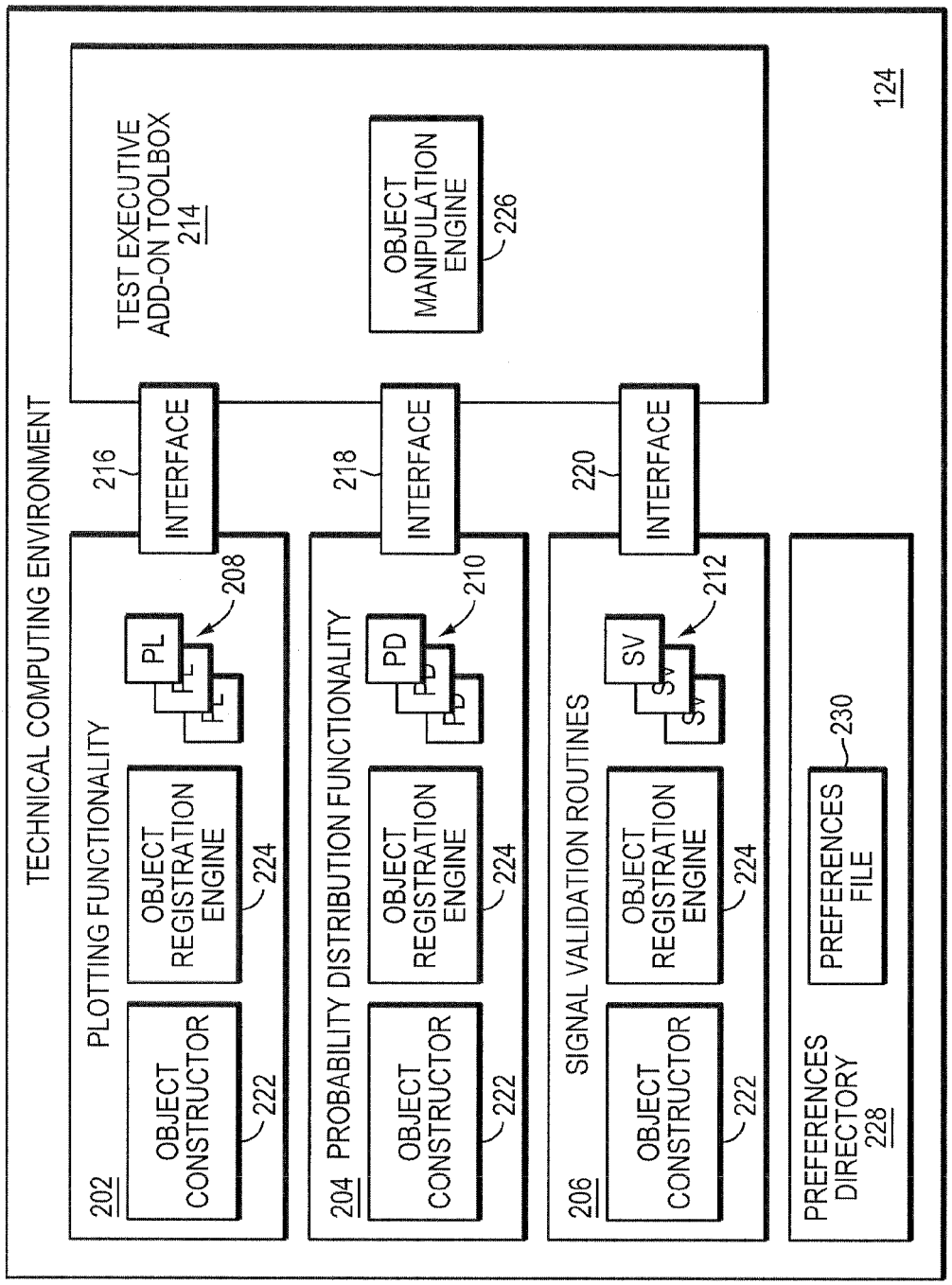
FIG. 2 is a schematic, functional illustration of a programming environment and add-on toolbox.

FIG. 2 is a schematic illustration of the programming environment 124. The programming environment 124 includes a plurality of libraries or routines that provide various functionality, which may be accessed by a user of the programming environment 124. In the illustrative embodiment, the programming environment 124 includes plotting functionality 202, probability distribution functionality 204 and signal validation functionality or routines 206, among other functionality. The plotting functionality 202 provides data plotting functions for graphing data. In the illustrative embodiment, the plotting functionality 202 supports functions for creating numerous two-dimensional (2-D) and three dimensional (3-D) plot types, such as line plots, vector plots, bar plots, area plots, feather plots, polar plots, scatter plots, image plots, surface plots, etc., designated generally 208. The probability distribution functionality 204 provides theoretical distributions of data based on assumptions of a source population. In the illustrative embodiment, the probability distribution functionality 204 supports numerous distribution functions, such as beta, exponential, inverse Gaussian, binomial, Poisson, inverse Wishart, etc., designated generally 210. The signal validation functionality or routines 206 provides tools and functions for processing simulation results and/or the output of a function, such as a MATLAB or other function. In the illustrative embodiment, the signal validation functionality or routines 206 support numerous functions or routines, such as Boolean comparison, absolute or relative tolerance checking, etc., designated generally 212.

As indicated above, each of the plotting, probability distribution and signal validation functionality 202, 204 and 206 may include certain pre-existing, built-in functions that are included as part of the programming environment 124. In addition, the programming environment 124 further includes one or more tools (not shown) that can be used to create one or more custom-defined functions, such as plotting, probability distribution, or signal validation functions, that may be specific to the user's needs. For example, the user may utilize these tools to create a custom defined plot tailored to his or her particular needs. The custom defined plot may be given a title or handle, "Custom Plot", and may be stored in memory, such as memory 104 and/or on disk, as part of the user's operation of the programming environment 124.

The programming environment 124 further includes at least one add-on product or toolbox, such as a test executive add-on toolbox 214. The test executive add-on toolbox 214 allows a user to define a test sequence for testing a system under test or a device under test (DUT). A test sequence is made up of a series of test elements in a particular order. One or more of the test elements, may be repeated multiple times as part of the test sequence, e.g., with different variables or settings during each iteration. In one embodiment, the test executive toolbox 214 communicates with each of the plotting, probability distribution and signal validation functionality 202, 204 and 206 of the programming environment 124 through a corresponding interface 216, 218 and 220, respectively. In an alternative embodiment, the test executive toolbox need not be an add-on toolbox and may be part of the built-in programming environment functionality or may be implemented as a script or a program running within the programming environment, or as a stand-alone application interfacing with the programming environment as deemed appropriate by one of skill in the art.

Those skilled in the art will understand that each interface 216, 218, and 220 may to be a specially designed object-oriented Application Programming Interface (API). Those skilled in the art will understand that other inter-process communication mechanisms besides or in addition to APIs may be used.

In the illustrative embodiment, each of the plotting, probability distribution and signal validation functionality 202, 204 and 206 includes an object constructor 222 and an object registration engine 224. The test executive toolbox 214, moreover, is configured with an object manipulation engine 226. Those skilled in the art will understand that a single object constructor 222 and/or a single object registration engine 224, which are accessible by each of the plotting, probability distribution and signal validation functionality 202, 204 and 206, may be alternatively utilized.

The programming environment 124 also may include a preferences directory 228 that contains a user preferences file 230. The user preferences file 230 is loaded when the programming environment 124 starts and is overwritten when changes are made or when it is closed based on changes made during the user's operation of the programming environment. The user preferences file 230 stores information about the desktop environment, keyboard, etc. As described herein, it may also contain information about functionality that was custom defined and registered by the user.

A suitable test executive add-on toolbox includes the SystemTest™ test executive also from The MathWorks, Inc.

The test executive 214 may be entirely or partially separate from the programming environment 124, rather than being part of it as illustrated in FIG. 2. Also, the object constructors 222 and/or the object registration engines 224 may be configured as part of the test executive 214, or they, as well as the object manipulation engine 226, may be configured as separate entities within the programming environment 124. A single interface may be provided to all of the functionality 202, 204 and 206, rather than a separate interface for each functionality type.

Figure 3:
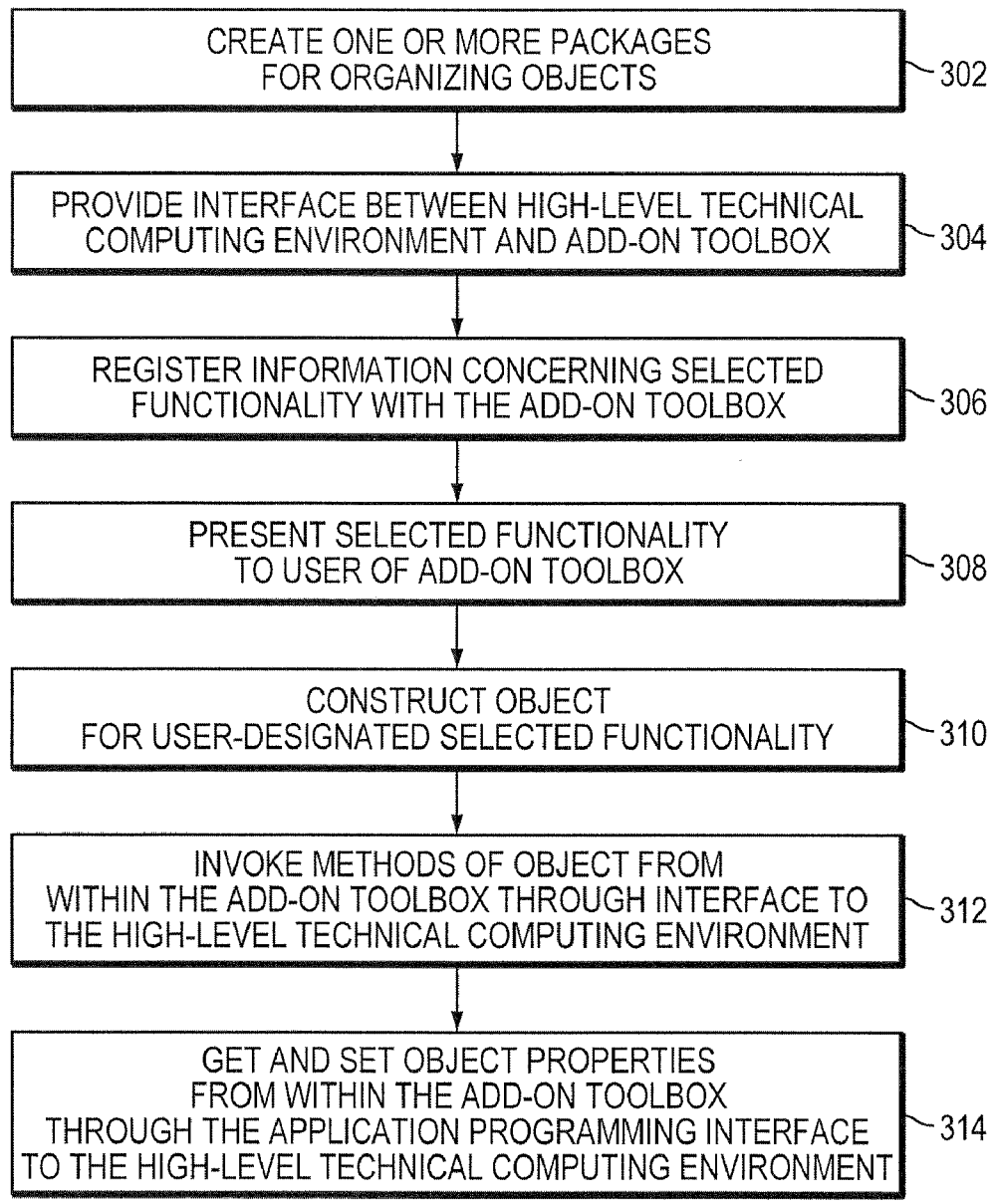
FIG. 3 is a flow diagram of a preferred method in accordance with the present invention.

FIG. 3 is a flow diagram 300 of a preferred method or process according to an embodiment of the present invention.

One or more packages (not shown) may be created within the programming environment 124, as indicated at block 302. As used herein, the term "package" refers to a namespace or library that organizes a set of related object classes and interfaces. In one embodiment, a separate package is created for each functionality type, e.g., plotting, probability distribution, and signal validation. For the plotting functionality, the respective package may be called, for example, 'mplotlib'. For the probability distribution functionality, the respective package may be called, for example, 'mprobdistriblib'. For the signal validation functionality, the respective package may be called, for example, 'msigvallib'. In alternative embodiments, other names or designations may be used for the packages.

As described above, one or more interfaces, such as interfaces 216, 218 and 220, is provided between the test executive add-on toolkit 214 and the functionality of the programming environment 124 that is to be made accessible from within the test executive add-on toolkit 214, as indicated at block 304.

Object Information Registration

Information regarding selected plotting, probability distribution and signal validation functions may be registered using the respective object registration engine 224, as indicated at block 306. More specifically, a determination is made regarding which particular plotting, probability distribution and signal validation functions are most likely to be of use from within the test executive toolbox 214. This determination may be made by the developer of the test executive toolbox 214. These particular plotting, probability distribution and signal validation functions are encapsulated by object classes, stored in an appropriate package, and then identified, e.g., flagged. On initialization or start-up of the test executive toolbox 214, it may use the object registration engines 224 for each of the functionality types to register information regarding these particular identified functions. For example, a PLOT command of the programming environment 124, such as the PLOT command of the MATLAB® system or LabVIEW MathScript, may be registered as a plotting function option. The registration of the identified functions may take place automatically, e.g., without any action of the part of the user of the test executive toolbox 214.

In one embodiment, the information registered for the selected functions is added to the preferences file 230 within the preferences directory 228. The information registered may include the object constructor name and a descriptive name of the option. For example, when registering a line plot option that is instantiated with the object constructor of MPLOTLIB.LINE( ) a string "mplotlib.line", and a descriptive name of "Line Plot" may be registered.

Registration may be performed by inserting a hard-coded list of functions that are to be registered into the initialization sequence of the test executive toolbox 214. A suitable hard-coded list for insertion into the test executive toolbox's initialization sequence may include the following as an example:

...
   mplotlibsegister('register', 'Line Plot', 'mplotlib.line')
   mplotlib.register('register', 'Scatter Plot', 'mplotlib.scatter)
   mplotlibsegister('register', 'Surface Plot', 'mplotlib.surf)
...

Alternatively, one or more registration commands may be added to the initialization sequence of the test executive toolbox 214. A suitable syntax for a registration command may be, for example:

MPLOTLIB.REGISTER('register', NAME, CONSTRUCTOR)
   where
     'register'—indicates a registration is to be performed,
   NAME—indicates a user visible name describing the option being registered, which may be used to present the option to the user of the test executive toolbox, and
   CONSTRUCTOR—indicates the string that needs to be evaluated to instantiate a class instance of this registered option, which when evaluated may provide an object of the correct type that can be used to perform the registered option.

It should be understood that in addition to 'register', an 'unregister' may be used to indicate that the following option is to be unregistered.

When the test executive add-on toolbox 214 is launched or started, it may check the user preferences file 230 of the programming environment 124 as part of its initialization sequence to determine which particular functions have been registered. As described herein, the test executive add-on toolbox 214 can then utilize this information to present the selected functions to a user of the test executive add-on toolbox 214, as indicated at block 308. The user can then designate and incorporate this functionality from within the test executive add-on toolbox 214.

In response to the user designating and configuring certain functionality, calls are issued through the interfaces 216, 218 and 220 that result in one or more objects being instantiated, methods of the objects being invoked, and properties or parameters of the objects being retrieved and set, to the extent they are public, as indicated at blocks 310, 312 and 314. Specifically, for an object that encapsulates a plotting function, the object may support a first method that creates a plot of the corresponding type, e.g., a scatter plot, using input data designated by the user, and displays the created plot on the computer display 120. A second method may create a sample of the plot and display the sample plot on the computer display 120. The sample plot provides the user with an indication of what the particular plot looks like. It does not plot any actual, user-identified input data. A suitable syntax for invoking the first method is:

HFIG=EVALUATE(OBJ)

where 'OBJ' is the plot object that was created with the OBJ command described herein. For example, for a plot object representing a line plot, the necessary input arguments may be the values for X and Y, which are provided by properties of OBJ and used to plot on the x and y axes, respectively. For a plot object representing a surface plot, the variable input arguments may be X, Y and Z, which are plotted on the x, y and z axes, respectively. For a plot object representing a histogram plot, the variable input arguments may be Y and NBins. For a plot object representing an image plot, the variable input arguments may be the image data or file, such as a JPEG file. For a plot object representing a time series plot, the variable input arguments may be a time series object.

A suitable syntax for invoking the second method is:

HFIG=CREATESAMPLEPLOT(OBJ)

The second method does not need variable input arguments because, as indicated above, it only creates a sample of the plot type.

As described further herein, the properties of the created plot object may include: a name property, a description property, a mode property and an argument names property, among others. Exemplary names include "Line Plot", "3-D Colored Surface Plot", "Histogram Plot", "Image Plot" and "Time Series Plot". The description may be help information for the plot object. Exemplary modes may include a create new figure mode, an add to axes mode, and a replace current axes mode. The argument names depend on the particular type of plot object. For example, for a Line Plot object, the argument names may be {'X' 'Y'}. For a Surface Plot object, the argument names may be {'X' 'Y' 'Z'}. For a Histogram Plot object, the argument names may be {'Y' 'Number of Bins'}. For an Image Plot object, the argument names may be {'Image'}. For a Time Series object, the argument names may be {'Time Series Object'}.

The encapsulated functions from the programming environment 124 can be accessed from within the add-on test executive toolbox 214 without having to add this functionality to the toolbox itself 214. In this way, improved operation and execution of the test executive add-on toolbox 214 may be obtained.

Those skilled in the art will understand that registration may be accomplished in other ways. For example, the test executive add-on toolbox 214 may be configured to check the user preferences file 230 for information regarding selected functionality. If the information has been logged to the user preferences file 230, e.g., as explained above, then no further action is taken by the test executive 214. If the information that the test executive 214 expects to find in the user preferences file 230 is not there, the test executive 214 may be further configured to log the missing information to the user's preferences file 230 itself. In yet another embodiment, information regarding the selected functionality may be registered directly with the test executive 214.

Object Construction

In one embodiment, a user causes objects to be constructed and interacts with those instantiated objects through one or more user interfaces of the test executive add-on toolbox 214 as displayed on the computer display 120.

Figure 4:
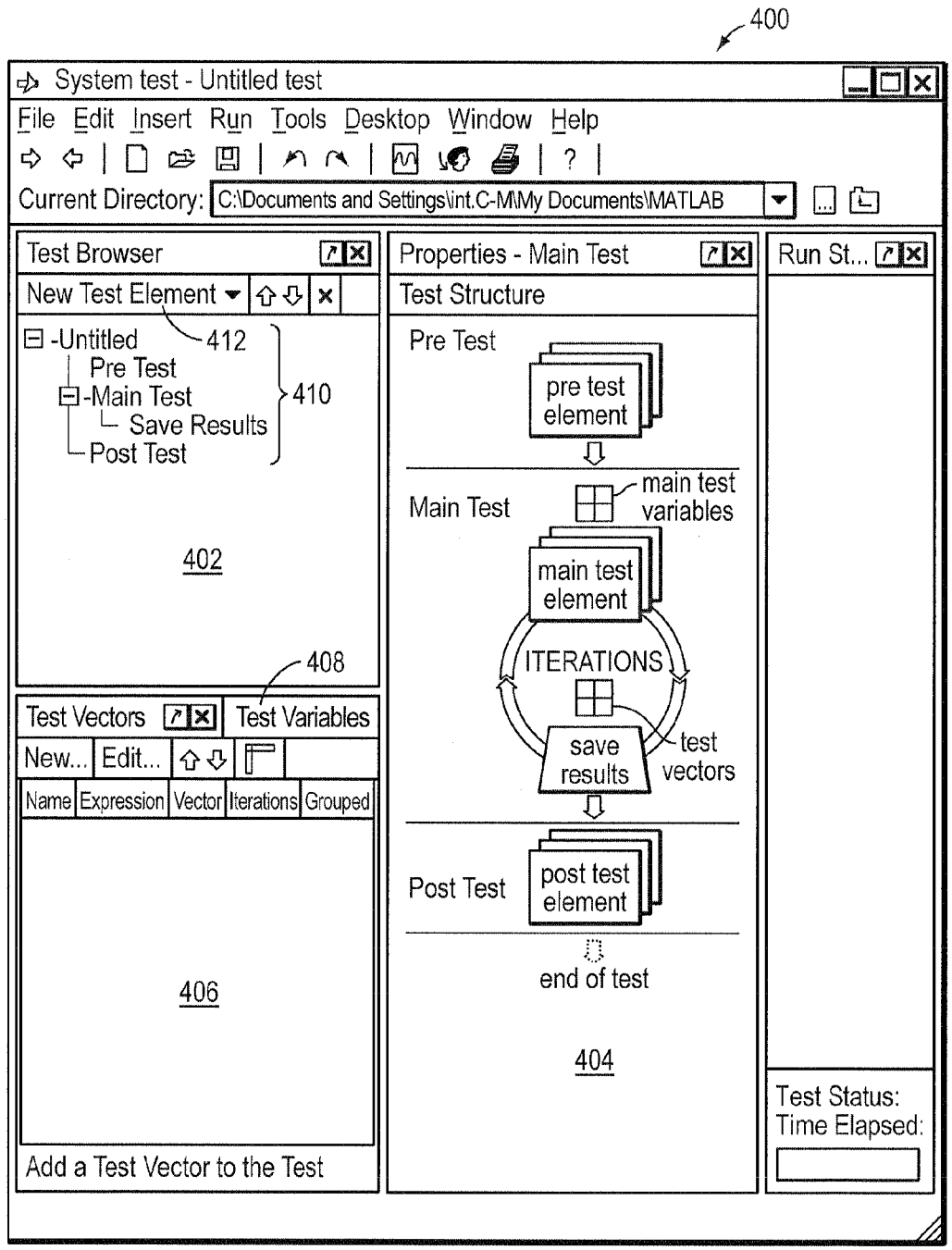
FIG. 4 is an illustration of a user interface.

FIG. 4 is a schematic illustration of a graphical user interface (GUI) 400 for operating the test executive toolbox 214. The test executive GUI 400 includes a test browser pane 402, a test structure pane 404, a test vector pane 406 and a test variables pane 408, which in this illustration is behind the test vector pane 406. The test browser pane 402 displays the test structure 410 being created, which may be in the form of a tree as shown. The test structure 410 is a series of test elements listed in a particular order corresponding to their order of execution. The test browser pane 402 further includes a New Test Element command button 412. To add additional elements to the test structure 410, a user may select the New Test Element command button 412.

Figure 5:
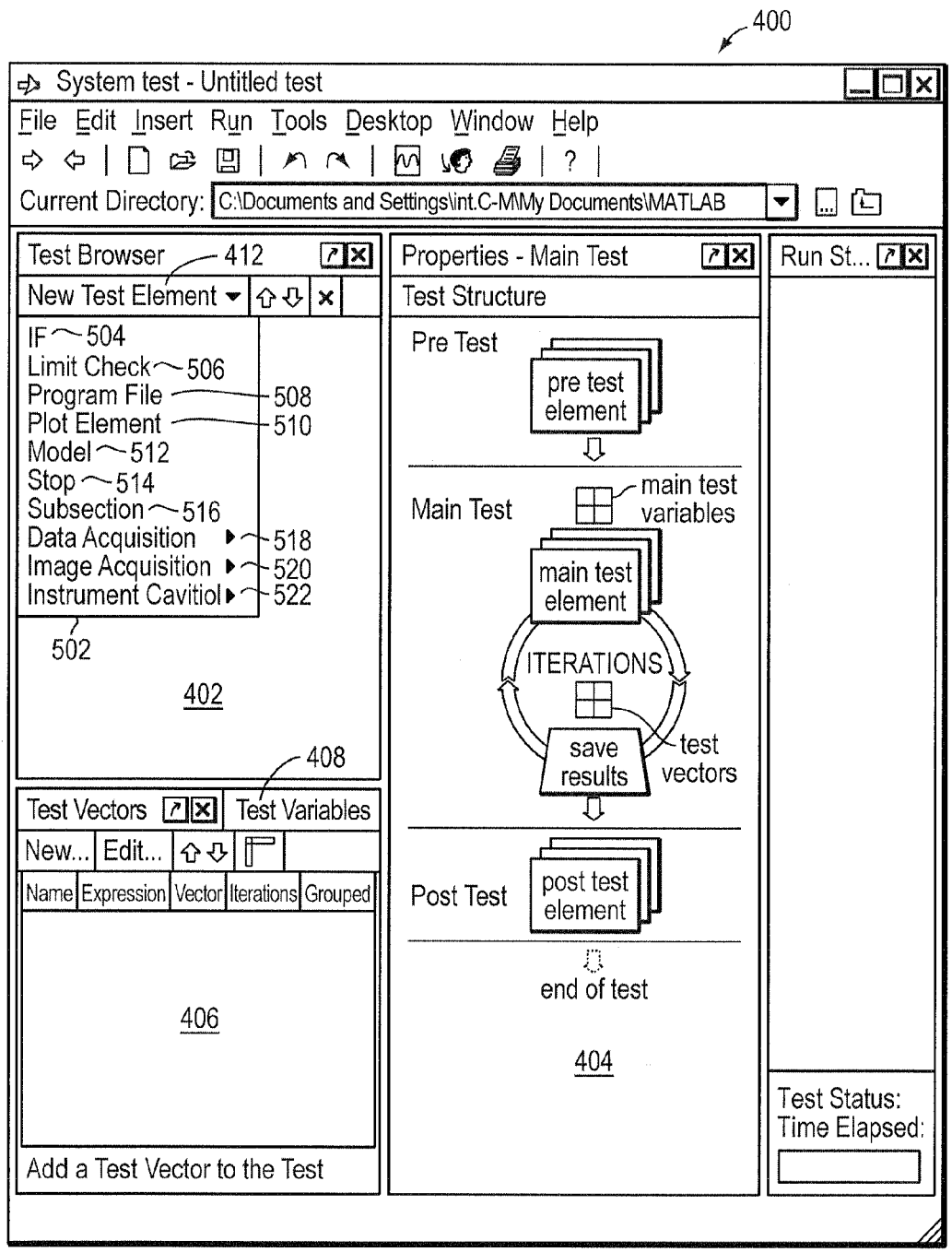
FIG. 5 is an illustration of a user interface.

FIG. 5 is a schematic illustration of the GUI 400 after the New Test Element command button 412 has been selected by the user. As shown, in response to the user selecting the New Test Element command button 412, a drop down menu 502 appears displaying a series of high-level test element types that may be selected for addition to the test sequence. The test elements types listed in the drop down menu 502 may include: an IF test element type 504, a Limit Check test element type 506, a Program File test element type 508, such as a MATLAB or other program file, for example, a Plot Element test element type 510, a Model test element type 512, such as a Simulink or other model, a Stop test element type 514, a Subsection test element type 516, various Data Acquisition test element types 518, various Image Acquisition test element types 520, and various Instrument Control test element types 522. The Data Acquisition, Image Acquisition, and Instrument Control test element types may be organized within respective folders.

Suppose the user first selects the Model test element type, and designates a particular model, such as a Simulink model, for example, as the unit under test, and then selects the Program File test element type and provides it a name called "Calculate Peak Height", which identifies a MATLAB file, for example. Suppose further that the user then selects the Plot Element test element type 510.

Figure 6A:
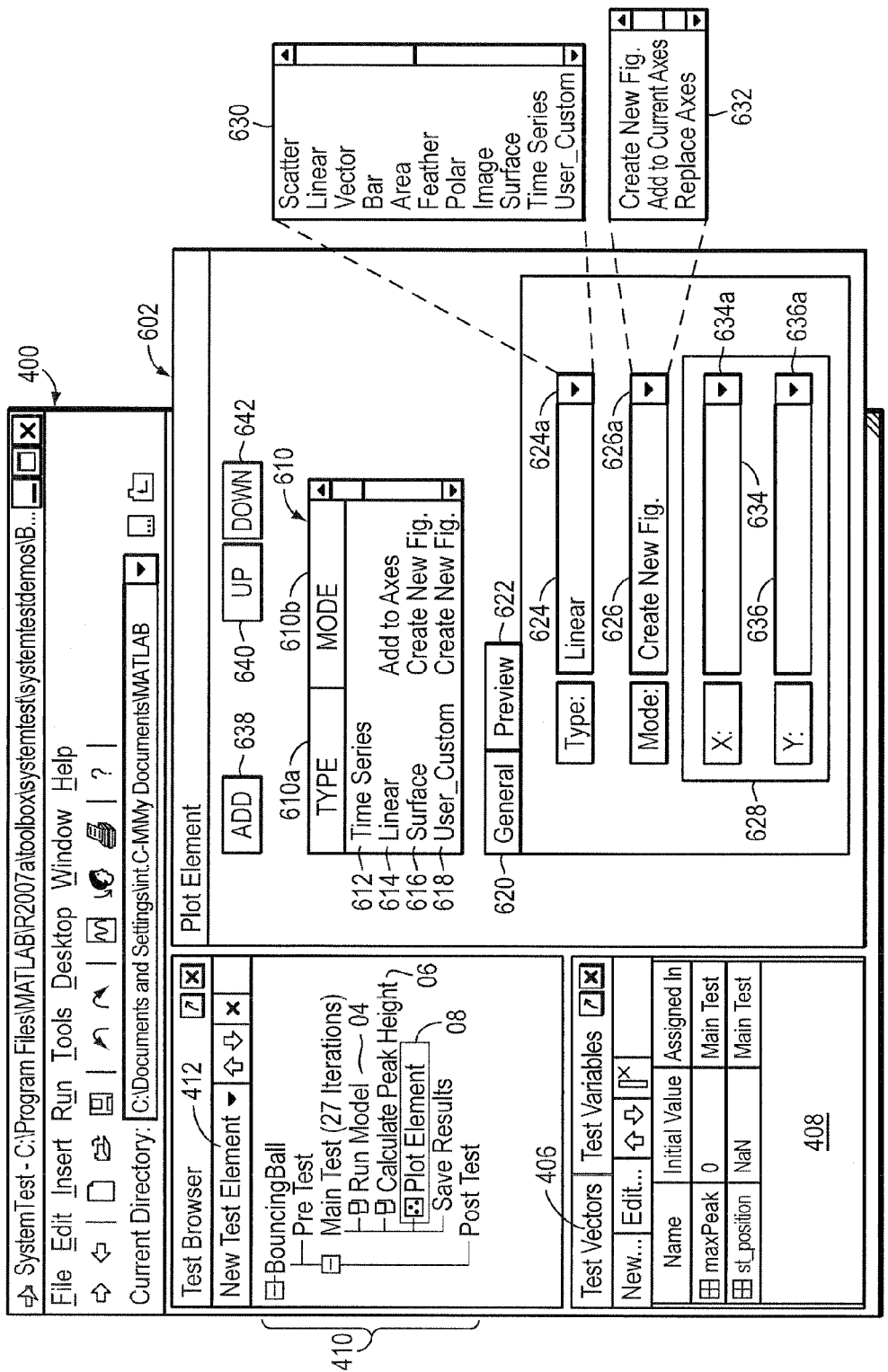
FIGS. 6A and 6B are an illustration of a user interface.
Figure 6B:
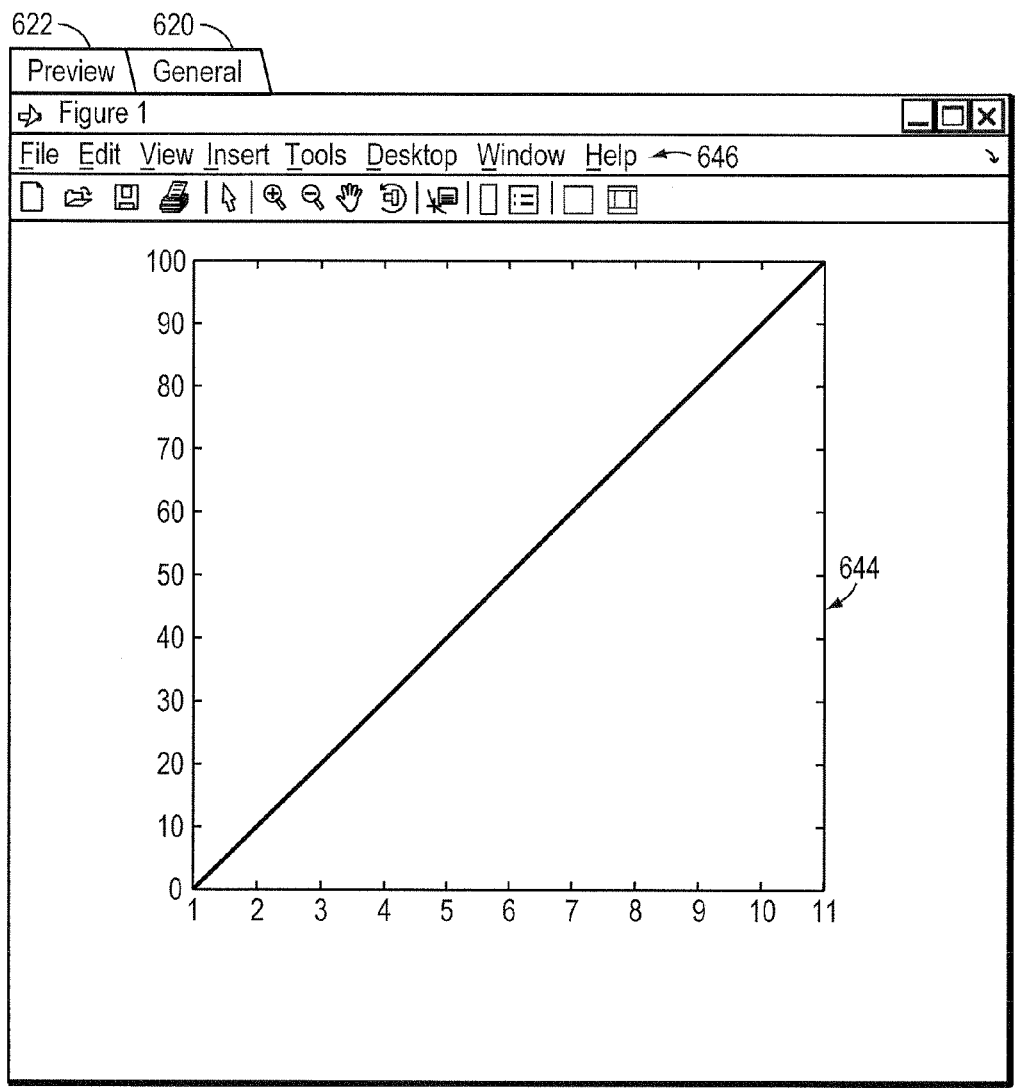

FIGS. 6A and 6B is a highly schematic illustration of a GUI 600 illustrating a Plot Element configuration window 602, which is displayed on computer screen 130 in response to the user selecting the Plot Element test element type 510 (FIG. 5). As shown in FIG. 6A, the test structure 410 now includes a "Run Model" test element 604, a "Calculate Peak Height" test element 606, and a newly added Plot Element test element 608, which is to be configured through configuration window 602.

The Plot Element configuration window 602 includes a plot element list box 610, which shows the both type and the mode of one or more plot elements that have been added to the test structure 410 at the point represented by the Plot element test element 608. The type of plot element refers to its style, such as scatter, line, vector, etc. The mode of plot element refers to the manner in which it is displayed relative to other plots. In the illustrative embodiment, there are several different modes of display for second or subsequent plots relative to a first plot. First, a second or subsequent plot can be added, e.g., overlaid, onto the axes of the first plot with both sets of plots being displayed on the same axes. Second, a second or subsequent plot can be displayed as its own new figure that is separate from the first and any other figure. Third, a second or subsequent plot can be added onto the first plot, but the axes of the first plot can be replaced with those of the second or subsequent plot. Fourth, multiple subplots may be created within one figure window. That is, multiple sets of axes, each with its own plot, may exist in a single figure window.

The plot element list box 610 may be organized into two columns 610a and 610b to show both the type and the mode, respectively, of the particular plot element(s) that have been added to the test structure 410. As shown, the test sequence currently includes a time series plot type 612, a line plot type 614, a surface plot type 616, and a User_Custom plot type 618. Because the Time Series plot type 612 is the first plot, it does not have a mode. The Line plot type 614 has been configured with the 'add_to_axes' mode. The Surface plot and User_Custom plot types 616, 618 have both been configured with the 'create_new_figure' mode.

The Plot Element configuration window 602 further includes a series of tabbed windows including a General window 620 and a Preview window 622 that may overlay each other. As shown in FIG. 6A, the General window 620 has a plurality of user interface widgets for selecting and configuring a new plot element to be added to the test structure 410. Specifically the General window 620 includes a plot type drop down box 624, a mode drop down box 626, and an input argument area 628. The user may select a drop down button 624a of the plot type drop down box 624 to list the available plot types for selection. As shown in window 630, plot types available for selection by the user may include a time series plot type, a line plot type, a surface plot type, and a User_Custom plot type, among others. Those skilled in the art will understand that window 630 may appear below the plot type drop down box 624 upon selecting its down button 624a. After selecting the desired plot type, e.g., Line, the user may select a drop down button 626a of the mode drop down box 626 to select a desired mode. As shown in window 632, available modes may include Create New Figure (Fig.), Add to Current Axes, and Replace Axes, among others. Again, those skilled in the art will understand that window 632 may appear below the mode drop down box 626 upon selecting its drop down button 626a.

The list of available plot types that is displayed to the user in the plot type drop down box 624 is obtained from the information registered in the user preferences file 230 by the object registration engine 224 of the plotting functionality 202. As described above, a particular set of plot functions were identified as being of interest to a user of the test executive add-on toolbox 214. Information regarding these particular plotting functions was registered by object registration engine 224 by adding the information regarding these particular plotting functions to the user preferences file 230. The test executive add-on toolbox 214 examines the user preferences file 230 upon start-up and, upon selection of the plot type drop down box 624, the test executive add-on toolbox 214 presents the available plot functions to the user for selection.

In response to the user selecting a particular plot type, e.g., the scatter plot type, from the plot type drop down box 624 for execution by the test structure 410 being created, the object manipulation engine 226 of the test executive 214 issues a call through interface 216 to the object constructor 222 of the plotting functionality 202. In response to this call, the object constructor 222 constructs, e.g., instantiates, an object that encapsulates the functionality for this plot type, e.g., scatter, as indicated at block 310. A suitable syntax for creating such an object is:

OBJ=package_name.create(name)

where 'name' specifies the particular type of object being created, and OBJ represents the name selected for the object being created.

For example, to create an object encapsulating scatter plot functionality of the programming environment 124, the following syntax may be used:

OBJ=MPLOTLIB.CREATE('Scatter Plot')

As shown, the constructor may be called with just the name of the type of object being created and no input arguments. In response, an object whose property values have yet to be set or whose properties are set to default values is constructed.

Figure 7:
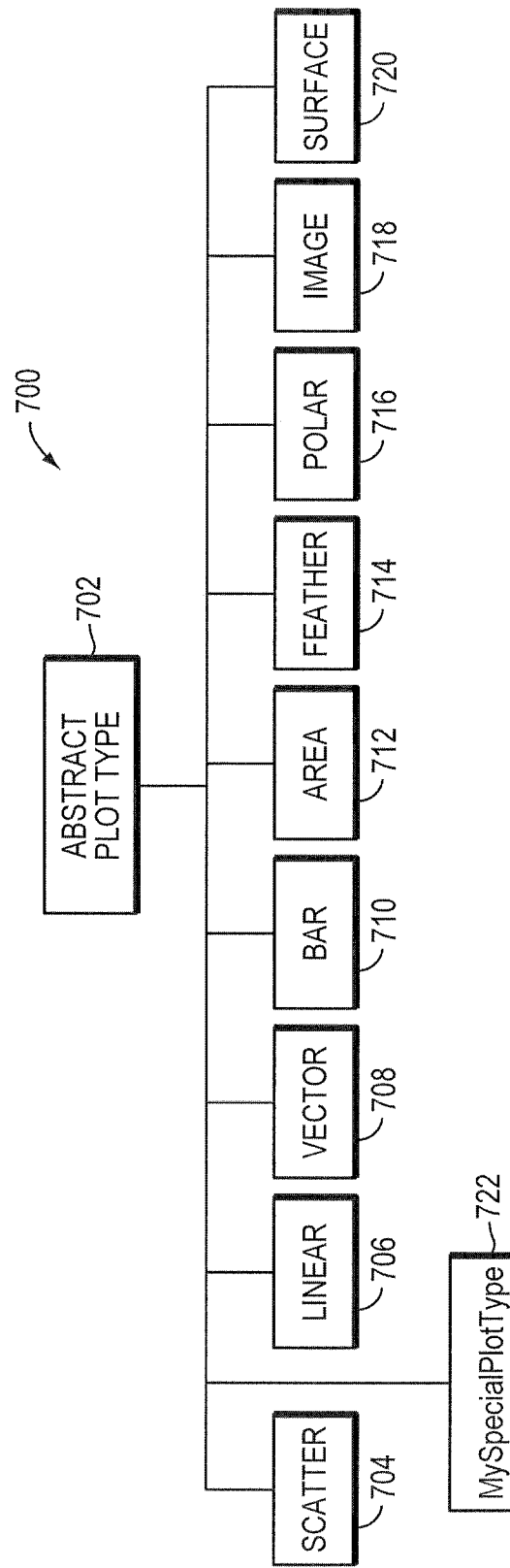
FIG. 7 is an object class hierarchy diagram.

FIG. 7 is a schematic illustration of an object class hierarchy 700 in accordance with a preferred embodiment of the present invention. The object class hierarchy 700 may include a base plot class, called "Abstract Plot Type" 702 or absPlotType, and a plurality of child classes, such as a scatter plot class 704, a line plot class 706, a vector plot class 708, a bar plot class 710, an area plot class 712, a feather plot class 714, a polar plot class 716, an image plot class 718, a surface plot class 720, and a MySpecialPlotType plot class 722. In alternative embodiments, other child plot classes also may exist. Each child class, e.g., scatter, inherits common methods and properties of the base class, i.e., absPlotType. A common property may be the plot's mode, which may be set to "add to current axes", "create new figure", "replaces axes", etc. In addition, each child class also defines special properties that are specific to it. For example, the scatter plot may have properties X and Y, which are vectors. The fill plot may have properties X and Y, which specify two-dimensional polygons. The polar plot may have properties theta and rho, which are the angle and radius.

The particular user interface widgets displayed in input argument area 628 may depend on the type of plot selected from drop down box 624. If a line plot type is selected, as shown, then the input argument area 628 may display drop down boxes 634 and 636 for the 'x' and 'y' values, respectively, of the line plot type being performed by the test structure 410. By selecting a drop down button 634a of the 'x' input box 634, the user can choose a variable defined in the test structure 410 to be the 'x' value of this line plot type. Similarly, by selecting a drop down button 636a of the 'y' input box 636, the user can choose a variable defined in the test structure 410 to be the 'y' value of this line plot. As indicated above, test variables may be displayed in test variable window 408, which is shown in front of the test vector window 406 in FIG. 6A.

After the user has designated and configured the plot type as desired, e.g., by selecting the desired plot type in drop down box 624, the desired mode in drop down box 626, and the input arguments in area 628, the user may select an add command button 638 of the configuration window 602. This causes a plot type to be added to the plot element list box 610. The Plot Element configuration window 602 further includes an up command button 640 and a down command button 642, which can be manipulated by the user to change the order in which the plot types of window 610 appear, and thus the order in which they are run during execution of the test structure 410.

In one embodiment, each type of plot object has a set of properties that are specific to it. Each object, moreover, may support a property information method, such as PROPINFO (OBJ), that returns information on each object property. In the case of the MATLAB® programming environment, this method may return a MATLAB structure, which may be an array with named data containers called fields that may contain any kind of data, such as strings, integers, etc. In the case of other programming environments, other structures may be returned. Each property, moreover, may have a flag associated with it that indicates whether the associated property is plot type specific or not. Accordingly, only plot type properties can be selected and displayed. For example, the method PROPINFO(OBJ, 'X') where OBJ is a line plot type object, and X is the property name for which information is being requested, may return a structure consisting of the following fields:

Name='X'

Type='double'

ReadOnly=false

IsTypeSpecific=true

Information entered by the user in the Plot Element configuration window 602 is passed to the object manipulation engine 226, which uses the received information to issue one or more calls through the interface 216 that invoke one or more methods on the corresponding plot objects. Furthermore, in response to the user specifying the values to be plotted, e.g., the variables for X and Y, in the input argument area 628, the object manipulation engine 226 issues one or more calls through the interface 216 to set the corresponding properties of the respective plot object that was instantiated.

For example, upon specifying a line type object in the General window 620, and then selecting the tab for the Preview window 622, the object manipulation unit 222 may formulate and issue a call to invoke the create_sample_plot method discussed above. That is, the object manipulation engine 226 may issue a call through the interface 216 that invokes the following method:

HFIG=CREATESAMPLEPLOT(OBJ)

In response, the line plot object that was created in step 304 (FIG. 3) would cause a sample plot to be displayed in the Preview window 622. FIG. 6B is an illustration of the Preview window 622. As shown, the Preview window 622 provides the user with a sample plot 644 indicating how the plot selected in the General window 620 (FIG. 6A) will appear when portion of the Plot Element test element 608 of the test structure 410 is run. The plot displayed in the Preview window 622 not only provides feedback to the user but may also include a plurality of plot editing tools supported by the programming environment 124.

In a further aspect, the user can modify properties of a selected plot element, such as the line plot type 614, from within the test executive toolkit 214. Specifically, from the preview window 622 (FIG. 6B), the user can select, for example, a Tools-->'Edit Figure' command from a menu bar 646. A first property edit window may be displayed to facilitate setting the plot element's first set of properties. In a preferred embodiment, the user may work with the first set of properties without having to select an 'Edit Figure' command. That is, these properties always may be available to the user for manipulation.

Figure 8:
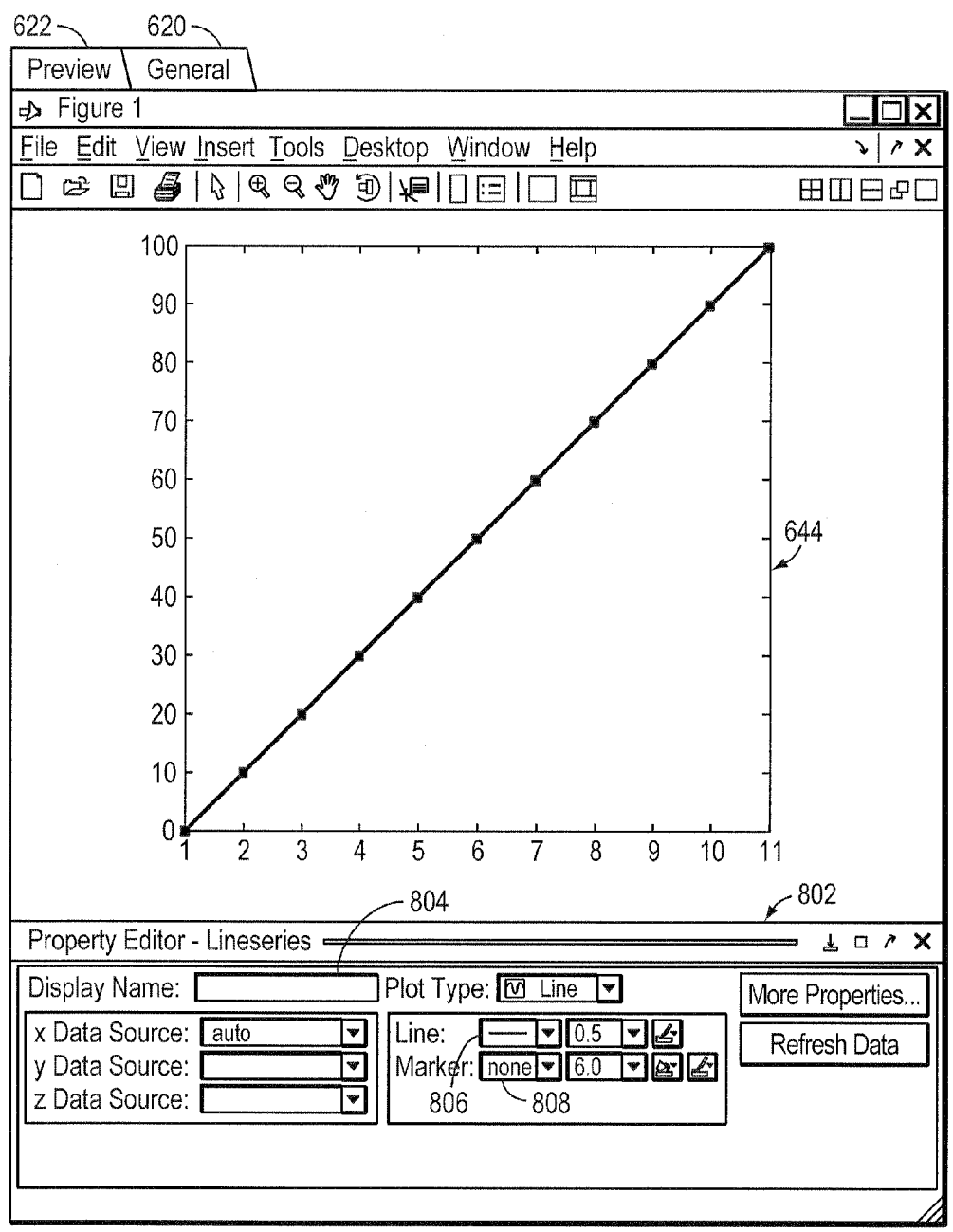
FIG. 8 is an illustration of a user interface.

FIG. 8 is a schematic illustration of a first property edit window 802 for the line plot type 614. The first property edit window 802 includes a name block 804 into which the user may enter a name for the line plot type 614 that will be displayed when the line plot type is displayed. The first property edit window 802 further includes a line style block 806 that can be manipulated by the user to select a desired line style. The first property edit window 802 also includes a marker block 808 that can be manipulated by the user to set the type of marks displayed on the line, e.g., circles, diamonds, squares, etc.

In one embodiment, first property edit window 802 is generated by the plotting functionality 202 of the programming environment 124. Thus, in setting line color, marker type, etc., window 802 may utilize core technology of the programming environment 124.

The first property edit window 802 also may include a 'More Properties . . .' command button 810. In response to the user selecting the 'More Properties . . .' command button 810, the object manipulation unit 222 issues one or more calls through the API 216 invoking a method that permits the user to get and set a second set of properties of the line plot type 614. In the preferred embodiment, a second property edit window is displayed to facilitate setting the plot type's second set of properties.

Figure 9:
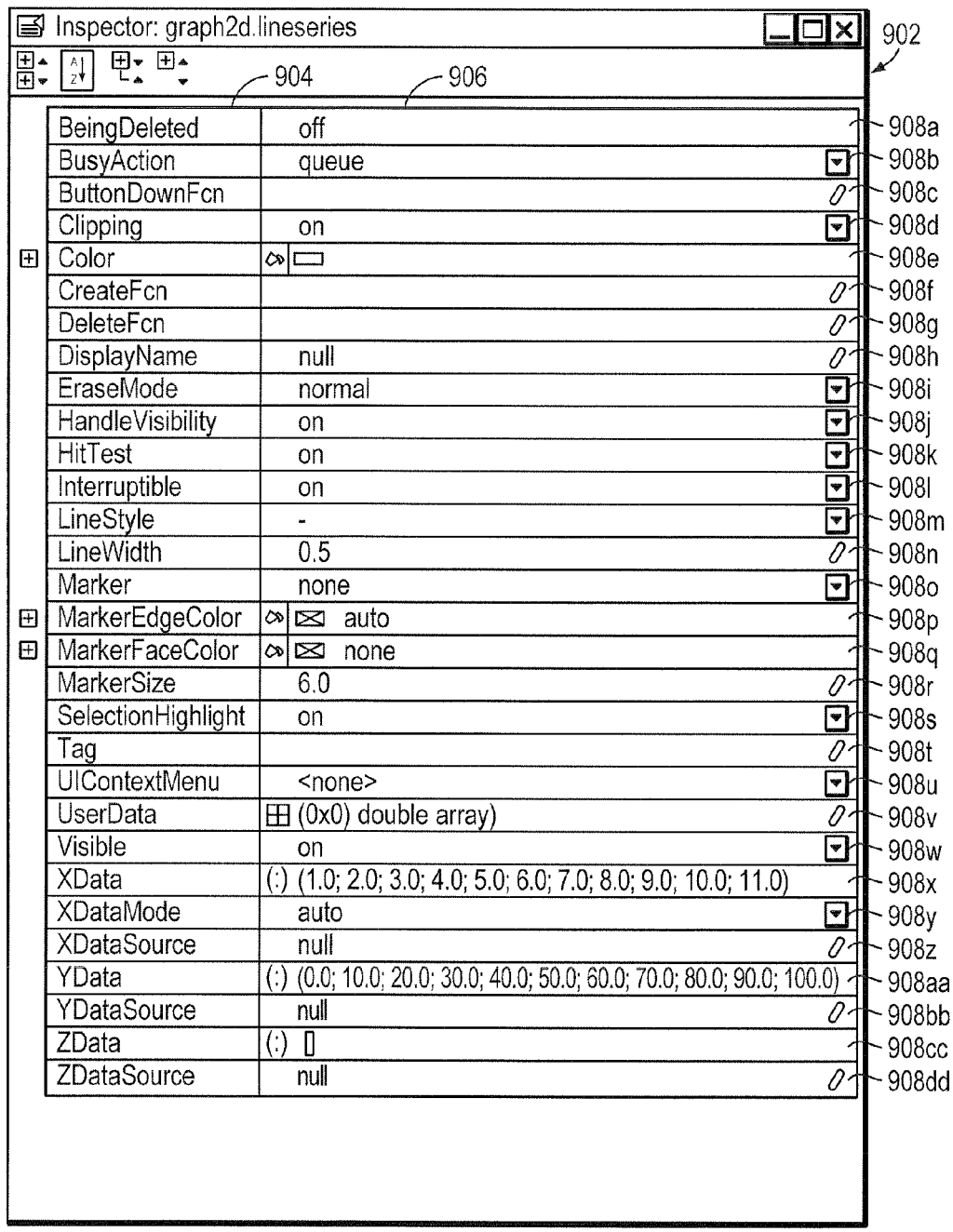
FIG. 9 is an illustration of a user interface.

FIG. 9 is a schematic illustration of a second property edit window 902 for the line plot type 614. The second property edit window 902 may be organized as a table having a plurality of rows and columns whose intersections define cells for storing data. Specifically, the second property edit window 902 has two columns: a property name column 904, and a property value column 906. The second property edit window 902 further includes a plurality of rows 908*a*-dd. Each row 908*a*-dd, moreover, corresponds to a particular property of the object that corresponds to the line plot type 614. The user can change the value of a property by manipulating the information or data stored in the respective property value cell of column 906.

The window 802 may not include a 'More Properties . . .' command button, thereby simplifying the interface. In alternative embodiments, the window 802 may be represented using any number of graphical and/or textual elements.

Returning to FIG. 6A, when the test structure 410 is run, the Run Model test element 604 is executed. Then, the calculate peak height test element 606 is executed. Next, the plot element test element 608 is executed. In this case, based on the user's configuration of the four different plots that make up the plot element 608, four plots are created and displayed on display 130 in response to the execution of the one plot element 608. Specifically, a time series plot is generated. Next, a line plot is created and it is added to the axes of the time series plot. Next, a surface plot is created as its own figure separate from the combined time series/line plot. Finally, the user_custom plot is created as its own separate figure.

To create each of these plots, the object manipulation engine 226 issues calls through the interface 216 to invoke methods of the time series plot object, the line plot object, the surface plot object and the user_custom plot object. Specifically, for the time series plot object, the object manipulation unit 222 issues a call invoking the following method:

HFIG=EVALUATE(OBJ)

As the user already set the properties of this object when he or she configured the time series plot during the creation of the test structure 410, this method need not include time series as an argument.

For the line plot object, the object manipulation engine 226 issues a call invoking the following method:

HFIG=EVALUATE(OBJ)

For the surface plot object, the object manipulation engine 226 issues a call invoking the following method:

HFIG=EVALUATE(OBJ)

The objects constructed during the creation of the test structure 410 may be persistent. Accordingly, when the user executes the test structure 410, the objects already exist. Nonetheless, in an alternative embodiment, the objects may be destroyed and then re-constructed, based on the configuration chosen during the development of the test structure 410, when the test sequence 410 is run.

As shown, the programming environment 124 includes certain, often extensive, pre-defined or pre-established functionality upon installation on the user's computer, workstation, etc. In accordance with the invention, the test executive add-on toolkit may take selected ones of this functionality and wrap it in object classes and make it accessible to the user of the test executive add-on toolkit. For example, as described, a line plot functionality, such as the MATLAB line plot, is accessible via the MPLOTLIB.LINE class.

In addition to registering selected ones of the pre-defined functionality, a generic functionality type, such as a generic plot type may be registered by the test executive add-on toolkit. A suitable command may be:

MPLOTLIB.REGISTER('register', 'Default Plot', CONSTRUCTOR)

where

'Default Plot' is the name used for the generic plot type.

This plot type, when selected by a user, may take a single argument, which may be called 'Data', and make a choice as to which particular plot type to use depending on the form or type of value(s) for 'Data'. For example, if the 'Data' specified by the user is a vector, it may select a line plot type. If the 'Data' specified by the user is an M×N×3 matrix, it may select an image plot type, as this is a typical format for Red, Blue, Green (RBG) image data. If the 'Data' is a time series object, it may select a time series plot object, and so on. In this way, a user may specify the variable in the test executive add-on toolkit and not have to change plot types even though the data the variable contains changes, e.g., from a vector to a M×N×3 matrix.

Custom Defined Functionality

As indicated above, in addition to making available to the test executive add-on toolkit 214 selected functionality that is built-in, e.g., predefined in, the programming environment 124, a user may also create custom defined functionality within the programming environment 124, and make this custom defined functionality available to the test executive 214. Specifically, the programming environment 124 may include tools with which the user can create a custom defined plot, or other custom defined functionality. These tools may include a workspace for receiving commands entered by the user, and an execution engine for executing, e.g., interpreting, those commands and displaying the results. The tools may further include one or more memories for storing the custom defined functionality. The custom defined functionality thus may become integrated in the programming environment 124.

Figure 10:
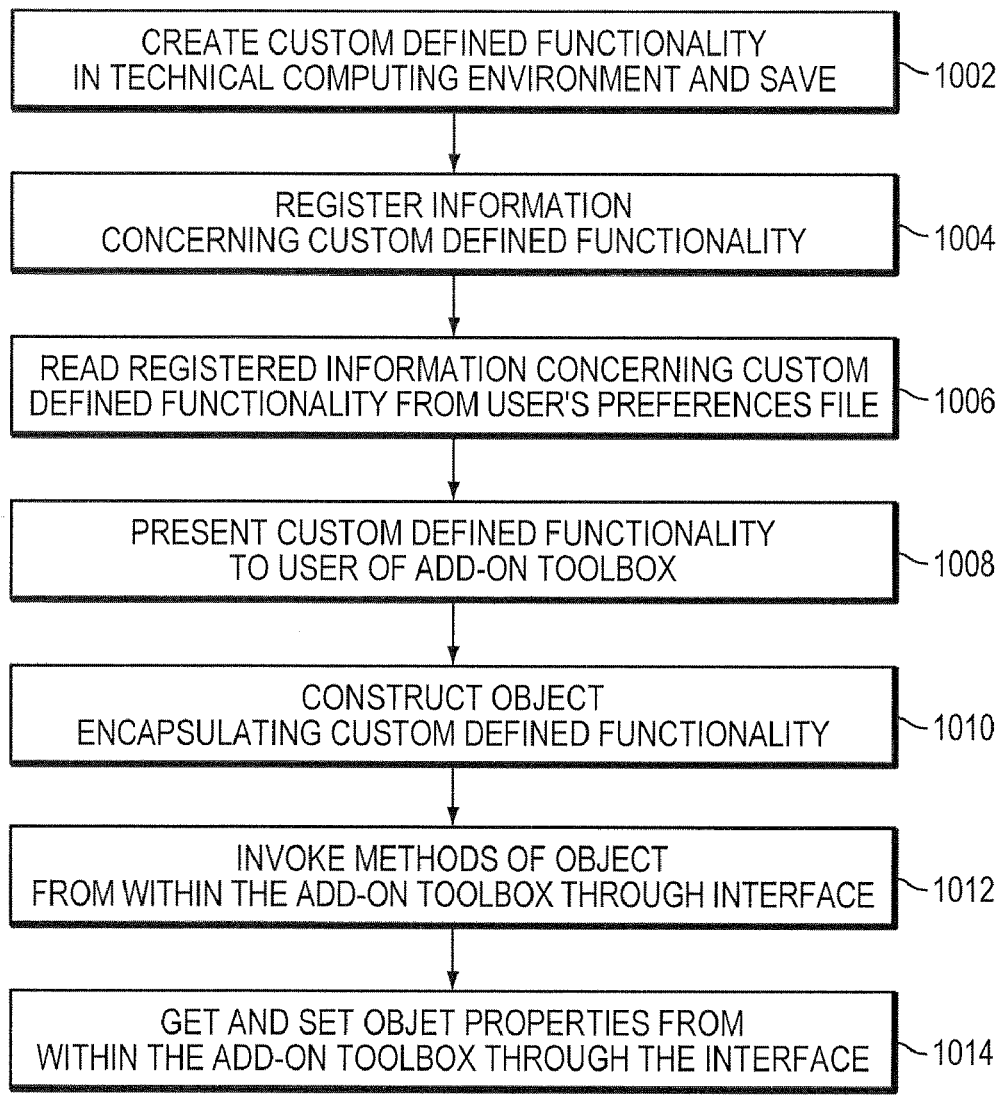
FIG. 10 is a flow diagram of a preferred method in accordance with the present invention.

FIG. 10 is a flow chart of a preferred method of making custom defined functionality available to the test executive add-on toolbox 214. The user may utilize the tools to create and save the custom defined functionality, such as a custom plot, as indicated at block 1002. If the user wishes to make this custom plot available from within the test executive 214, information concerning the custom defined plot may be registered or logged, as indicated at block 1004. For example, after creating and naming the custom defined plot, the user may enter a registration command into a workspace of the programming environment. A suitable syntax for this command is:

MPLOTLIB.REGISTER('register', 'My_Plot_Type', 'myplotpackage.myspecialplot')

where

'My_Plot_Type' describes the name of the plot type option that may be show in the list of available plot types within the test executive toolbox, and 'myplotpackage.myspecialplot' describes the constructor for instantiating a myspecialplot object that is managed in a class package called myplotpackage that the user created using the programming environment 124.

In response to the registration command, the object registration engine 224 may register or log information regarding the custom defined plot in the user preferences file 230. When the test executive 214 is started, it reads the user preferences file 230, including the information regarding the custom defined plot, as indicated at block 1006. The test executive 214 may also present the functionality of the custom defined plot to a user, e.g., in the plot type drop down box 624, as indicated at block 1008. The test executive 214 may utilize the same name assigned by the creator of the custom define plot functionality to facilitate the proper selection by the user.

In response to the user selecting the custom defined plot functionality from the plot type drop down box 624, the object manipulation engine 226 issues a call through interface 216 to the object constructor 222 of the plotting functionality 202. In response to this call, the object constructor 222 constructs, e.g., instantiates, an object that encapsulates the functionality of the custom defined plot type, as indicated at block 1010. As described above, a suitable syntax for creating such an object is:

OBJ=package_name.create(name)

where 'name' specifies the particular type of object being created, and OBJ represents the name selected for the object being created.

The object that encapsulates the custom defined plot type may be constructed from the MySpecialPlotType class 722, which is a child class of the AbsPlotType parent class 702. In this way, the object inherits the methods and properties or parameters of the is parent class 702.

In response to the user configuring the custom defined plot functionality, calls are issued through the interface 216 that result in one or more methods of the object being invoked, and one or more properties of the object being retrieved and set, as indicated at blocks 1012, 1014.

For example, to cause a plot corresponding to the custom defined plot type to be displayed, the object manipulation engine 226 may issue a call invoking the following method:

HFIG=EVALUATE(OBJ)

As shown, custom defined functionality created within the programming environment, such as a custom defined plot type, can be made accessible from the test executive without having to incorporate that functionality into the test executive itself.

Other Functionality

In a similar manner, the probability distribution functionality 204 and the signal validation routines 206 may be made accessible from within the add-on test executive toolbox 214 without having to add that functionality to the toolbox 214 itself.

The foregoing description has been directed to specific embodiments of the present invention. It will be apparent, however, that other variations and modifications may be made to the described embodiments, with the attainment of some or all of their advantages. For example, the system and method of the present invention may be used with other add-on products, toolboxes, or modules besides a test executive. Therefore, it is the object of the appended claims to cover all such variations and modifications as come to within the true spirit and scope of the invention.

What is claimed is:

1. A method for accessing selected functionality of a programming environment from within an add-on toolbox to the programming environment, the method comprising:
    providing an interface between the add-on toolbox and the programming environment;
    registering information regarding the selected functionality of the programming environment;
    accessing, by the add-on toolbox, the registered information for use in presenting the selected functionality to a user of the add-on toolbox;
    in response to the user designating one of the selected functionality corresponding to the registered information, issuing a first call through the interface;
    in response to the first call, instantiating an object from an object class that encapsulates the designated one of the selected functionality, the instantiated object having a plurality of properties and supporting a plurality of methods;
    in response to the user configuring the designated one of the selected functionality from within the add-on toolbox, issuing a second call through the interface;
    in response to the second call, setting at least one property of the instantiated object that encapsulates the designated one of the selected functionality;
    storing the at least one property in a computer memory;
    in response to the user directly interacting with the designated one of the selected functionality from within the add-on toolbox, issuing a third call through the interface; and
    in response to the third call, invoking at least one method supported by the instantiated object, wherein
    the selected functionality is external to the add-on toolbox.

2. The method of claim 1 wherein the selected functionality is at least one of plotting functionality, probability distribution functionality, and signal validation functionality.

3. The method of claim 1 wherein the add-on toolbox is a test executive.

4. The method of claim 1 further comprising:
    creating custom defined functionality within the programming environment;

presenting the custom defined functionality to the user of the add-on toolbox;

in response to the user designating the custom defined functionality from within the add-on toolbox, issuing a fourth call through the interface;

in response to the fourth call, instantiating an object from an object class that encapsulates the custom defined functionality, the instantiated object that encapsulates the custom defined functionality having a plurality of properties and supporting a plurality of methods;

in response to the user interacting with the custom defined functionality from within the add-on toolbox, issuing a fifth call through the interface; and in response to the fifth call, invoking at least one method supported by the instantiated object that encapsulates the custom defined functionality.

5. The method of claim 4 further comprising:

registering information regarding the custom defined functionality;

accessing by the add-on toolbox the registered information regarding the custom defined functionality for use in presenting the custom defined functionality to the user of the add-on toolbox.

6. The method of claim 4 wherein the selected functionality is at least one of plotting functionality, probability distribution functionality, and signal validation functionality.

7. The method of claim 1 wherein the interface is an Application Programming Interface (API).

8. The method of claim 1 wherein the selected functionality is plotting functionality, and the at least one method presents a sample plot on a display.

9. A non-transitory computer readable storage media comprising code for accessing selected functionality of a programming environment from within an add-on toolbox to the programming environment, the code executable by a computer to:

provide an interface between the add-on toolbox and the programming environment;

register information regarding the selected functionality of the programming environment;

access, by the add-on toolbox, the registered information to present the selected functionality to a user of the add-on toolbox;

in response to the user designating one of the selected functionality corresponding to the registered information, issue a first call through the interface;

in response to the first call, instantiate an object from an object class that encapsulates the designated one of the selected functionality, the instantiated object having a plurality of properties and supporting a plurality of methods;

in response to the user configuring the designated one of the selected functionality from within the add-on toolbox, issue a second call through the interface;

in response to the second call, set at least one property of the instantiated object that encapsulates the designated one of the selected functionality;

store the at least one property in a computer memory;

in response to the user interacting with the designated one of the selected functionality from within the add-on toolbox, issue a third call through the interface; and in response to the third call, invoke at least one method supported by the instantiated object, wherein the selected functionality is external to the add-on toolbox.

10. A programming environment executing on a computer, the programming environment comprising:

selected functionality for performing a task;

an object constructor configured to construct objects encapsulating the selected functionality, each object having a plurality of properties and supporting a plurality of methods;

an add-on toolbox;

one or more object registration engines configured to register, with the add-on toolbox, one or more of the selected functionality of the programming environment; and an interface between the selected functionality and the add-on toolbox, wherein the add-on toolbox presents the one or more of the registered selected functionality to a user of the add-on toolbox, and includes an object manipulation engine configured to (i) issue one or more first calls through the interface to the object constructor to construct an object encapsulating a designated one of the registered selected functionality, (ii) issue one or more second calls through the interface setting at least one property of the constructed object, and (iii) issue one or more third calls through the interface invoking at least one method of the constructed object.

11. The programming environment of claim 10 further comprising a user preferences file, wherein the one or more object registration engines store information in the user preferences file regarding the one or more of the selected functionality.

12. The programming environment of claim 10 wherein the selected function is predefined functionality of the programming environment.

13. The programming environment of claim 10 wherein the selected functionality is custom defined functionality specified by the user of the programming environment.

14. The programming environment of claim 10 wherein the selected functionality is at least one of plotting functionality, probability distribution functionality, and signal validation functionality.

15. The programming environment of claim 10 wherein the add-on toolbox is a test executive.

16. The programming environment of claim 10 wherein the interface is an Application Programming Interface (API).

17. The non-transitory computer readable storage media of claim 9, wherein the add-on toolbox is a test executive.

18. The non-transitory computer readable storage media of claim 9, wherein the code is further executable by the computer to:

create custom defined functionality within the programming environment;

present the custom defined functionality to the user of the add-on toolbox;

in response to the user designating the custom defined functionality from within the add-on toolbox, issue a fourth call through the interface;

in response to the fourth call, instantiate an object from an object class that encapsulates the custom defined functionality, the instantiated object that encapsulates the custom defined functionality having a plurality of properties and supporting a plurality of methods;

in response to the user interacting with the custom defined functionality from within the add-on toolbox, issue a fifth call through the interface; and in response to the fifth call, invoke at least one method supported by the instantiated object that encapsulates the custom defined functionality.

19. The non-transitory computer readable storage media of claim 18, wherein the code is further executable by the computer to:

register information regarding the custom defined functionality; and access by the add-on toolbox the registered information regarding the custom defined functionality for use in presenting the custom defined functionality to the user of the add-on toolbox.

20. The non-transitory computer readable storage media of claim 9, wherein the selected functionality is at least one of plotting functionality, probability distribution functionality, and signal validation functionality.

* * * * *

UNITED STATES PATENT AND TRADEMARK OFFICE
CERTIFICATE OF CORRECTION

PATENT NO. : 8,307,328 B1
APPLICATION NO. : 12/061400
DATED : November 6, 2012
INVENTOR(S) : Christian A. Portal Page 1 of 1

It is certified that error appears in the above-identified patent and that said Letters Patent is hereby corrected as shown below:

On the Title Page, Item [57] should read:

Abstract:
A system and method encapsulates selected functionality of a programming environment, defines an interface to the encapsulated functionality, and utilizes the encapsulated functionality from within an add-on toolbox to the programming environment through the interface. Objects may be constructed from the selected functionality of the programming environment. The functionality may be built-in or custom designed functionality. The objects are registered with the add-on test toolbox, and made available to a user of the add-on toolbox. The user may enter information into a user interface specifying selected functionality and its properties. An object manipulation engine receives the to-information entered into the user interface, and uses it to issue calls through the interface to construct the objects and invoke one or more of the methods.

In the Specifications:

In col. 1, line 27 should read:
test a device under is-test (DUT) or a system under test.

In col. 4, line 22 should read:
216, 218, and 220 may to-be a specially designed object- In col. 13, line 57 should read:
parameters of the-is parent class.

In col. 14, line 22 should read:
variations and modifications as come to-within the true spirit Signed and Sealed this
Eighteenth Day of June, 2013

Teresa Stanek Rea
*Acting Director of the United States Patent and Trademark Office*